(12) United States Patent
Sia, Jr. et al.

(10) Patent No.: US 9,981,538 B2
(45) Date of Patent: May 29, 2018

(54) VEHICLE DOOR LINING ASSEMBLY, AND METHODS OF USE AND MANUFACTURE THEREOF

(71) Applicant: Honda Motor Co., Ltd., Tokyo (JP)

(72) Inventors: Generoso Tan Sia, Jr., Plain City, OH (US); Jason Dilley, Plain City, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 15/067,137

(22) Filed: Mar. 10, 2016

(65) Prior Publication Data

US 2017/0259658 A1  Sep. 14, 2017

(51) Int. Cl.
| | |
|---|---|
| *B60J 10/08* | (2006.01) |
| *B60J 10/86* | (2016.01) |
| *E06B 7/23* | (2006.01) |
| *B60J 5/04* | (2006.01) |
| *B60J 10/36* | (2016.01) |

(52) U.S. Cl.
CPC ............... *B60J 10/86* (2016.02); *B60J 5/047* (2013.01); *B60J 10/36* (2016.02); *E06B 7/2301* (2013.01)

(58) Field of Classification Search
CPC ........ B60J 5/0412; B60J 5/0418; B60J 5/047; B60J 5/06; B60J 10/22; B60J 10/265; B60J 10/36; B60J 10/80; B60J 10/86; E06B 7/2301; B60R 13/0243
USPC .............................. 49/479.1, 492.1; 296/155
See application file for complete search history.

(56) References Cited

U.S. PATENT DOCUMENTS

| | | | |
|---|---|---|---|
| 2,219,382 A * | 10/1940 | Conlon | .................... B60J 10/80 24/293 |
| 3,797,857 A | 3/1974 | Reeves | |
| 4,067,146 A * | 1/1978 | Mesnel | ................. B29C 47/124 49/490.1 |
| 5,094,498 A | 3/1992 | Yada | |
| 5,193,876 A | 3/1993 | Yada et al. | |
| 5,281,291 A | 1/1994 | Yada et al. | |
| 5,344,205 A | 9/1994 | Yada et al. | |
| 5,492,387 A | 2/1996 | Yada et al. | |
| 5,553,423 A | 9/1996 | Kato | |

(Continued)

FOREIGN PATENT DOCUMENTS

| | | |
|---|---|---|
| EP | 570598 A1 | 11/1993 |
| EP | 2030824 A1 | 3/2009 |

*Primary Examiner* — Katherine W Mitchell
*Assistant Examiner* — Abe Massad
(74) *Attorney, Agent, or Firm* — Kenealy Vaidya LLP (57) ABSTRACT

Some embodiments are directed to a door lining assembly for use with a vehicle having a vehicle interior, a vehicle door, and weather-stripping configured to facilitate sealing of the door in a closed position. The door lining assembly can include a front portion connected to a lower section of the vehicle door. The front portion can include a flange that is connected to the weather-stripping. The door lining assembly can also include an elongated transition portion that extends in a vehicle longitudinal direction and is attached to the front portion and the lower section of the vehicle door. The transition portion can be structured to have a gradually varying depth in a lateral direction of the vehicle, such that one end of the transition portion that is connected to the front portion extends further into the vehicle interior than the opposite longitudinal end.

20 Claims, 8 Drawing Sheets

(56) References Cited

U.S. PATENT DOCUMENTS

| | | | |
|---|---|---|---|
| 6,196,615 B1 | 3/2001 | Yada | |
| 6,321,490 B1 | 11/2001 | Vance | |
| 6,378,251 B2 * | 4/2002 | Fukumoto | B60J 5/0412 |
| | | | 49/503 |
| 6,641,205 B1 * | 11/2003 | Russell | B60J 10/80 |
| | | | 296/146.9 |
| 7,344,181 B2 | 3/2008 | Koshimichi | |
| 8,375,640 B2 * | 2/2013 | Willett | B60J 10/32 |
| | | | 49/490.1 |
| 8,667,737 B2 * | 3/2014 | Hughes, Jr. | B60J 10/30 |
| | | | 49/475.1 |
| 8,801,070 B2 | 8/2014 | Takeuchi et al. | |
| 8,840,170 B2 | 9/2014 | Zimmer et al. | |
| 2014/0049067 A1 * | 2/2014 | Kasuya | B60R 13/043 |
| | | | 296/146.5 |
| 2014/0217773 A1 | 8/2014 | Shimizu et al. | |
| 2017/0021708 A1 * | 1/2017 | Thiele | B60J 10/25 |

* cited by examiner

VEHICLE DOOR LINING ASSEMBLY, AND METHODS OF USE AND MANUFACTURE THEREOF

BACKGROUND

The disclosed subject matter relates to a vehicle door lining assembly, and methods of use and manufacture thereof. More particularly, the disclosed subject matter relates to methods and apparatus that enhance vehicle door seal performance from intrusion of external elements, such as may occur during vehicle operation in an environment.

External elements, and in some cases foreign substances, can enter into vehicle interiors under certain circumstances, including through gaps and spaces between body panels such as doors. These external elements or substances can cause damage or harm to the vehicle, as well as to vehicle occupants, including damaging vehicle systems and safety mechanisms on which occupant well-being may depend. This potential damage or harm can be influenced by a variety of factors, including configurations of vehicle panels such as doors and application of weatherproofing seals.

SUMMARY

However, various vehicular design factors may make it challenging to sufficiently impede or prevent intrusion of external elements and substances into the vehicle interior. For example, accessibility and safety considerations for vehicle passengers/occupants may make it beneficial to provide various shaped and configured doors and door openings to facilitate ingress/egress. These various shaped and configured doors and openings can form gaps therebetween. These gaps between vehicle doors and corresponding openings may permit intrusion of external elements and substances into the vehicle interior. As a result, the vehicle interior, as well as occupants located therein, can be subject to damage or harm from such intrusion.

It may therefore be beneficial to provide a vehicle door lining assembly, and methods of use and manufacture thereof, that address at least one of the above and/or other challenges of related art vehicles. In particular, it may be beneficial to enhance vehicle door seal performance from intrusion of external elements, such as by improving integrity of the seal between the vehicle door and the door opening. For example, portions of the vehicle door lining assembly can be configured to provide support for guiding and attaching a weatherstrip to span space between the door and corresponding opening.

In some of these and/or other embodiments, the vehicle door lining assembly can be configured to include a support structure to which the weatherstrip may attach for guiding the weatherstrip along a predetermined portion of the door. In some of these and/or other embodiments, the lining assembly can be configured with a support structure transitioning the weatherstrip from inboard to outboard orientations complementary to the door opening. In some of these and/or other embodiments, the lining assembly can be configured to have a wedge shaped support structure to provide smooth transition from the lining assembly to the panel assembly and solid structure for the weatherstrip to maintain attachment to the door.

Some embodiments are therefore directed to a door lining assembly for use with a vehicle having a vehicle interior, a vehicle door, and weather-stripping configured to facilitate sealing of the door in a closed position. The door lining assembly can include a front portion connected to a lower section of the vehicle door. The front portion can include a flange that is connected to the weather-stripping. The door lining assembly can also include an elongated transition portion that extends in a vehicle longitudinal direction and is attached to the front portion and the lower section of the vehicle door. The transition portion can be structured to have a gradually varying depth in a lateral direction of the vehicle, such that one end of the transition portion that is connected to the front portion extends further into the vehicle interior than the opposite longitudinal end.

Some other embodiments are directed to a vehicle door assembly for use with a vehicle having an interior. The vehicle door assembly can include a vehicle door; weather-stripping configured to facilitate sealing of the door in a closed position; and a door lining assembly. The door ling assembly can include a front portion connected to a lower section of the vehicle door. The front portion can include a flange that is connected to the weather-stripping. The door lining assembly can also include an elongated transition portion that extends in a vehicle longitudinal direction and is attached to the front portion and the lower section of the vehicle door. The transition portion can be structured to have a gradually varying depth in a lateral direction of the vehicle, such that one end of the transition portion that is connected to the front portion extends further into the vehicle interior than the opposite longitudinal end.

Still other embodiments are directed to a method of installing a door lining assembly in a vehicle having a vehicle interior, a vehicle door, and weather-stripping configured to facilitate sealing of the door in a closed position. The method can include: connecting a front portion to a lower section of the vehicle door; connecting a flange of the front portion to the weather-stripping; attaching an elongated transition portion to the front portion and the lower section of the vehicle door so as to extend in a vehicle longitudinal direction; and configuring the transition portion to have a gradually varying depth in a lateral direction of the vehicle, such that one end of the transition portion that is connected to the front portion extends further into the vehicle interior than the opposite longitudinal end.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of a door lining assembly 40 are disclosed below, and FIGS. 1-8 illustrate some of these embodiments. However, embodiments are intended to include or otherwise cover many different embodiments and structures for supporting and attaching weatherstrips to vehicle doors.

The embodiments are disclosed below in the context of a slide door of an automobile, and in particular a minivan. However, the embodiments are intended to be applicable to any automobile door assembly, any type of automobile, and any type of vehicle.

Various headings are provided below for convenience and clarity. However, these headings are not intended to limit the scope or content of the disclosure, and/or the scope of protection afforded the various inventive concepts disclosed herein.

I. Overall Vehicle

Figure 1:
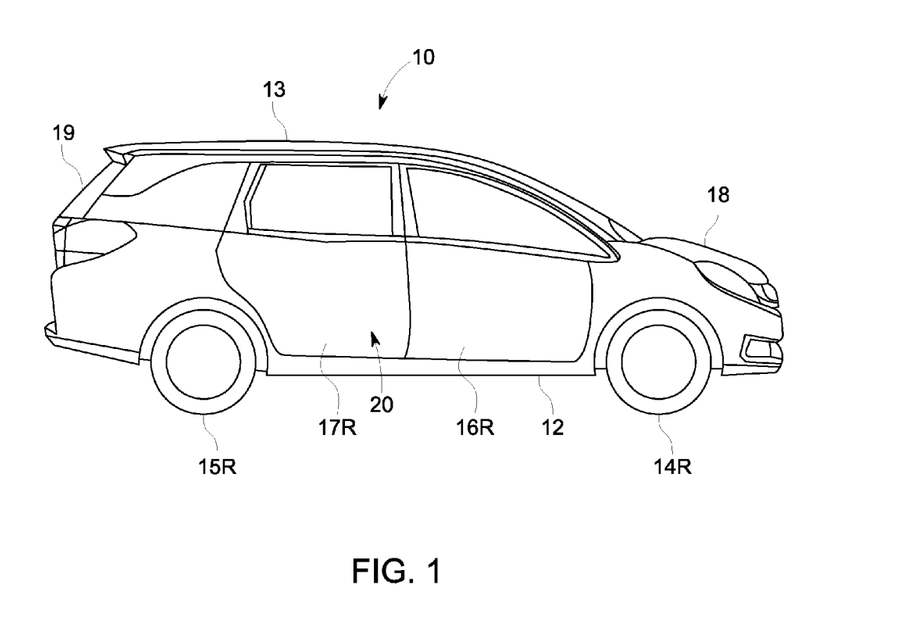
FIG. 1 is a side view of an exemplary vehicle including slide door assemblies having weatherstrip supports in accordance with the disclosed subject matter.
Figure 2:
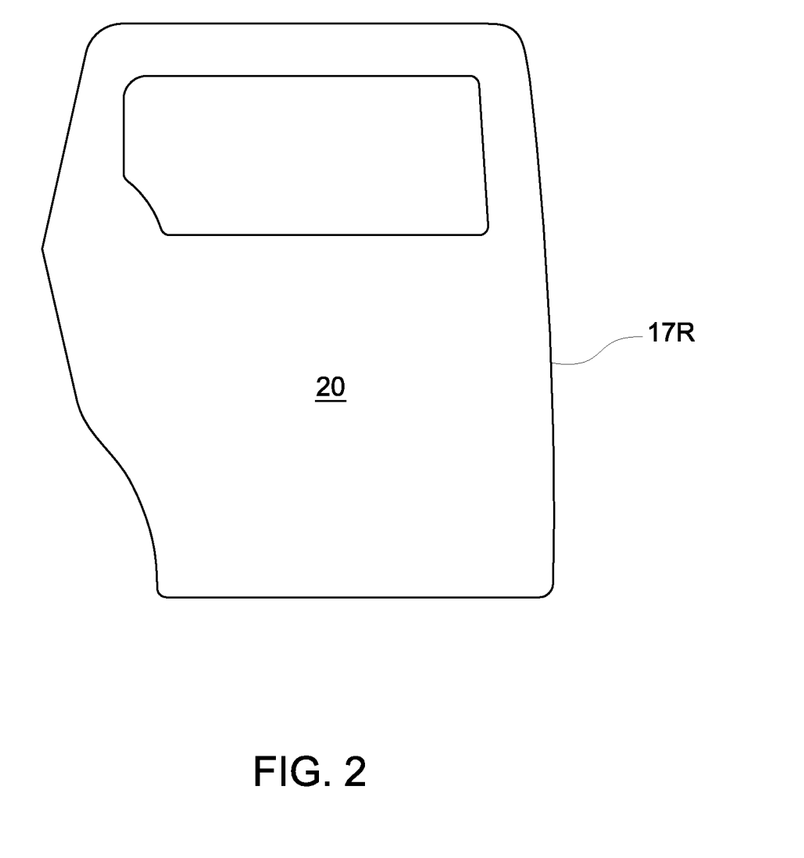
FIG. 2 is a side view of the passenger side slide door assembly including a door panel assembly.

FIG. 1 is a plan view of an exemplary vehicle 10 including slide door assemblies 17L,R having weatherstrip supports in accordance with the disclosed subject matter; and FIG. 2 is a plan view of the passenger-side (right-side) slide door assembly 17R. The vehicle 10 shown in FIGS. 1 and 2 is primarily for use on paved roadways, and can be referred to as a passenger vehicle, and in particular is a minivan. However, as indicated above, the disclosed door panel assembly can be used with any vehicle that is configured for travel along any one or combination of improved, unimproved, and unmarked roadways and paths constituted by gravel, dirt, sand, etc. For example, embodiments are intended to include or otherwise cover any other type of automobile, including passenger car, truck, ATV, etc. In fact, embodiments are intended to include or otherwise cover configurations of the slide door assemblies 17L,R for use in any other type of vehicle, such as an aircraft, boat, ship, train, spacecraft, etc.

The vehicle 10 can include a body 12, a pair of front wheels 14L,R (the left-side front wheel is obstructed from view), a pair of rear wheels 15L,R (the left-side rear wheel is obstructed from view), a pair of front door assemblies 16L,R (the left-side front door assembly is obstructed from view), a pair of slide door assemblies 17L,R (the left-side slide door assembly is obstructed from view), a roof 13, a hood 18, a tailgate assembly 19, a frame assembly, and a powertrain. The frame assembly can be a separate assembly that is connected to the body at discrete locations, such as in a body-on-frame construction, or the frame assembly and the body can be integrated as a single unit (also known as a unit body, unibody or monocoque construction). The frame assembly and the powertrain are omitted from FIG. 1 for simplicity and clarity of the drawings.

II. Slide Door Assemblies

FIG. 2 is a plan view of the passenger-side (right-side) slide door assembly 17R including a door panel assembly 20. The right-side slide door assembly 17R can be configured to have an approximately straight front edge, while having a contoured rear edge to extend around the rear wheel 15R. The slide door assembly 17R can have a window disposed within an upper portion.

The slide door assembly 17R of the present embodiment can be configured to slide rearward along tracks guiding the slide door assembly 17R along a predetermined path. Sliding rearward reveals an interior of the vehicle 10 to permit ingress and egress to/from a passenger compartment. Particularly, moving the slide door assembly 17R to an open position can facilitate passenger access to both second and third row seating configured as either benches or chairs.

An exterior of the slide door assembly 17R can be configured as the door panel assembly 20 such that the door panel assembly 20 fits within a complementary opening in the body 12 when the slide door assembly 17R is in a closed position. The door panel assembly 20 can be attached to a door lining assembly on an interior of the slide door assembly 17R, the door lining assembly having a weatherstrip extending along a bottom edge. The weatherstrip can be configured to form a seal with adjacent portions of the body 12 when the slide door assembly 17R is in the closed position.

The driver-side (left-side) slide door assembly 17L can be configured so as to mirror the right-side slide door assembly 17R, and thus can include corresponding door panel assembly 20, door lining assembly, and weatherstrip. Descriptions of the aforementioned components below in relation to the right-side slide door assembly 17R are therefore correspondingly applicable to the left-side slide door assembly, though not specifically described below.

A. Door Panel and Lining Assemblies

Figure 3:
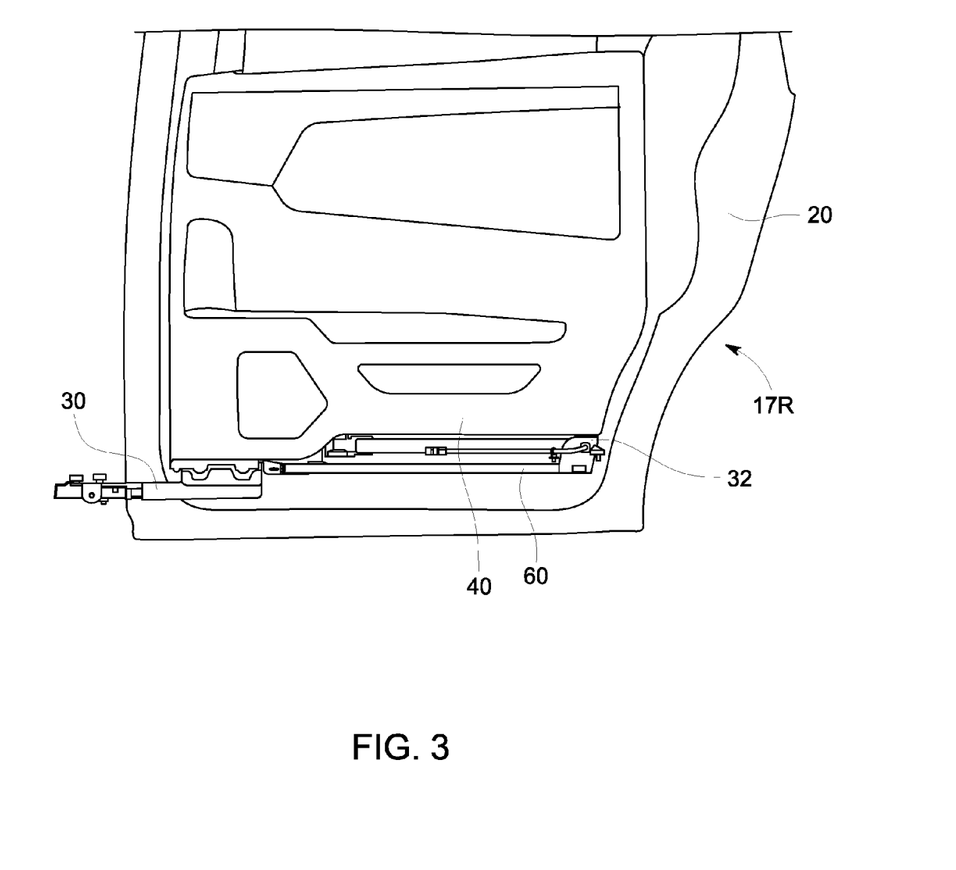
FIG. 3 is a partial perspective view of the door panel assembly connected with a door lining assembly.

FIG. 3 is a partial perspective view of the door panel assembly 20 connected with a door lining assembly 40. As described above, the door lining assembly 40 can be attached to the door panel assembly 20 so as to form opposing sides of the right-side slide door assembly 17R, with the door lining assembly 40 forming an interior side and the door panel assembly 20 forming an exterior side. The door panel assembly 20 can be formed to extend beyond a perimeter of the door lining assembly 40 such that flanges are formed along a perimeter of the door panel assembly 20. The perimeter flanges of the door panel assembly 20 can overlap corresponding portions of the body 12 to permit the slide door assembly 17R to sit flush against the opening when in the closed position. The flanges of the door panel assembly 20 can include locking mechanisms for controlling movement of the slide door assembly 17R.

The door lining assembly 40 can be configured as surfaces that may be contacted by passengers/occupants within the interior, specifically the passenger area, of the vehicle 10. The door lining assembly 40 may include switches, such as for locking/unlocking doors, as well as opening/closing windows, heating/cooling seats, controlling infotainment, etc. Additionally, the door lining assembly 40 can be configured with arm rests, cup holders, storage bins and compartments, ash trays, etc. The door lining assembly 40 can be configured to approximately span the interior opening for the slide door assembly 17R, and may stop or continue upward beyond the window.

The slide door assembly 17R can include various electrical and mechanical components within space between the door panel assembly 20 and the door lining assembly 40. These electrical and mechanical components can control movement and locking of the slide door assembly 17R, actuation of the windows, etc. Airbags and other supplemental restraint systems (SRS) can also be contained in the space between the assemblies 20,40.

The door lining assembly 40 has a stepped lower edge that is raised at a rearward portion so as to accommodate a harness 32 connected to the door lining assembly 40. The harness 32 attaches to the door panel assembly 20 proximate the bottom edge and extends adjacent the stepped lower edge at the rearward portion of the door lining assembly 40. The harness 32 can be configured as a component contributing to passenger safety via belting systems, and may, for example, serve as an anchor point for a nearby passenger seatbelt.

The stepped lower edge of the door lining assembly 40, as described above, is lower at a frontward portion fore of the harness 32, the stepped lower edge having a roller arm bracket 30 connected thereto. The roller arm bracket 30 specifically attaches to a flange on the stepped lower edge of the door lining assembly 40 at the frontward portion, and extends beyond a front side of the slide door assembly 17R. The roller arm bracket 30 can be configured to communicate with track(s) extending along a floor of the interior opening for the slide door assembly 17R. Thus, the roller arm bracket 30 can be engaged with the tracks and thereby guide sliding movement of the slide door assembly 17R between the opened and closed positions.

The door lining assembly 40 can also include a weatherstrip support 50 disposed along the stepped lower edge, specifically at the frontward portion adjacent the roller arm bracket 30. As described below, the weatherstrip support 50 can be positioned aft of the roller arm bracket 30, and can provide solid structure and a smooth transition for a weatherstrip 60 along the lower portion of the slide door assembly 17R.

B. Weatherstrips and Weatherstrip Supports

The slide door assembly 17R of the present embodiment can include the weatherstrip 60 extending along the lower portion, the weatherstrip 60 extending adjacent and approximately a length of the stepped lower edge of the door lining assembly 40. The weatherstrip 60 can be configured as an elongated rubber strip, compressible against an adjacent portion of the body 12 at the interior opening when the slide door assembly 17R is in the closed position. The elasticity of the weatherstrip 60 can thereby act as a seal along the lower portion of the slide door assembly 17R, protecting the interior of the vehicle 10 from water and other intrusive substances and contaminants outside of the vehicle 10. In some embodiments, the weatherstrip 60 may be hollow, while other embodiments may solid or segmented weatherstrips.

As will be described below, a front portion of the weatherstrip 60 can be configured to cover a portion of the roller arm bracket 30 and attach to the door lining assembly 40, while a rear portion of the weatherstrip 60 is then configured to attach to the door panel assembly 20 proximate the harness 32. In order to transition between the varying attachment points for the weatherstrip 60, the door lining assembly 40 can include the weatherstrip support 50, which can support an intermediate portion of the weatherstrip 60 between the front and rear portions. In FIG. 3, the front portion of the weatherstrip 60 covering the roller arm bracket 30 and the weatherstrip support 50 is not shown to provide a detailed view of those components.

Figure 4:
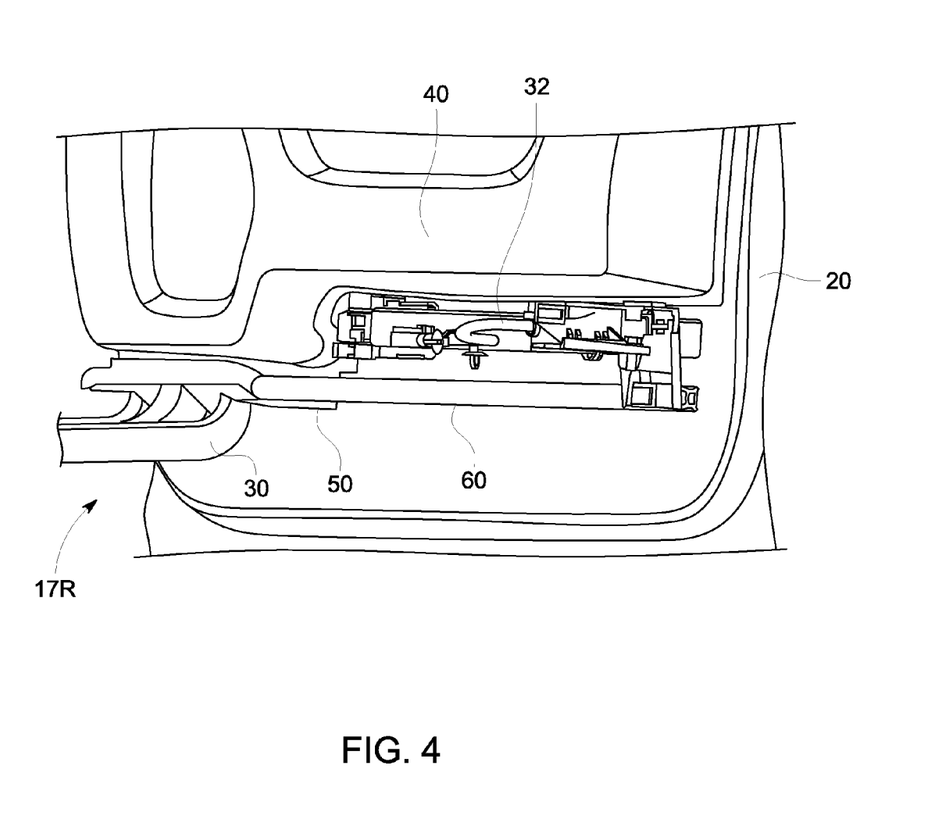
FIG. 4 is a partial perspective view of an exemplary weatherstrip attached to the door lining assembly.

FIG. 4 is a partial perspective view of the exemplary weatherstrip 60 attached to the door lining assembly 40. As shown in FIG. 4, positioning of the harness 32 on the door panel assembly 20 dictates configuration of the stepped lower edge of the door lining assembly 40 since the harness 32 is attached to the door panel assembly 20 above the weatherstrip 60. The door lining assembly 40 therefore can be raised adjacent the harness 32 to facilitate the above described attachment. However, the stepped lower edge can also be lower at the frontward portion to provide for attachment with the roller arm bracket 30. Since the roller arm bracket 30 is positioned lower than the harness 32, the door lining assembly 40 can include the stepped lower edge to provide for attachment with both components.

The rear portion of the weatherstrip 60 of the present embodiment is thusly spaced from the door lining assembly 40, and any flange thereof, such that the weatherstrip 60 can then be configured to attach to the door panel assembly 20 instead. However, since the front ward portion of the stepped lower edge extends downward to connect the roller arm bracket 30, the front portion of the weatherstrip 60 can be configured to attach to the door lining assembly 40, specifically a flange thereof. As described below, this difference in components to which portions of the weatherstrip 60 can be attached may cause the weatherstrip 60 to transition between inboard and outboard positions along the slide door assembly 17R.

Figure 5:
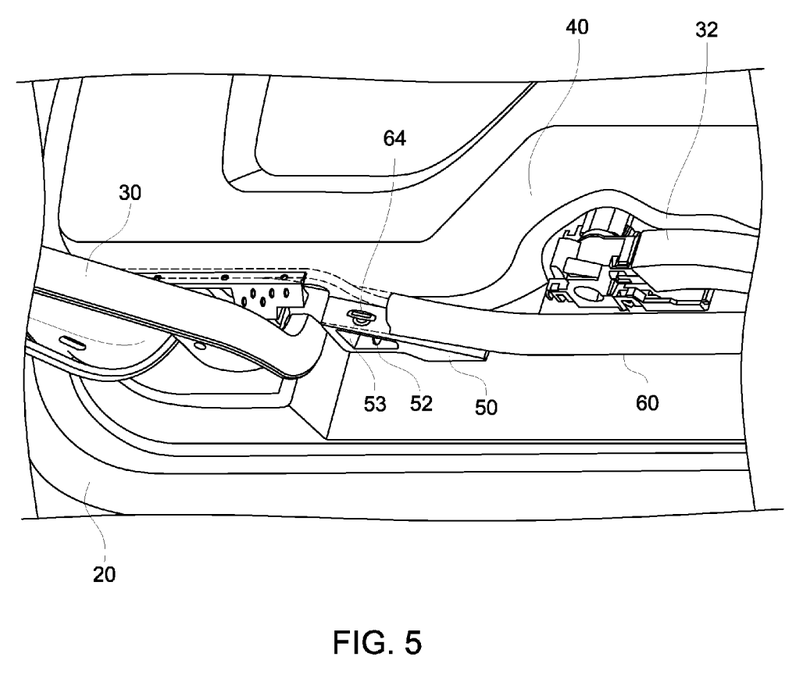
FIG. 5 is a partial perspective view of the weatherstrip attached to the door lining assembly including a weatherstrip support.

FIG. 5 is a partial perspective view of the weatherstrip 60 attached to the door lining assembly 40 including the weatherstrip support 50. In FIG. 5, an underside of the door lining assembly 40 is shown including the weatherstrip 60 transition between the frontward and rearward portion of the stepped lower edge via the weatherstrip support 50. As will be described below, the transition along the stepped lower edge of the door lining assembly 40 facilitates the weatherstrip 60 transition from an inboard orientation to an outboard orientation. In FIG. 5, the front portion of the weatherstrip covering the roller arm bracket 30 and the weatherstrip support 50 is shown in dashed lines to provide a detailed view of those components.

The door lining assembly 40 in the present embodiment includes the lower frontward portion of the stepped lower edge to which the roller arm bracket 30 is attached. This configuration ensures the door lining assembly 40 is inboard at the frontward portion relative to the door panel assembly 20 to which it is mounted. In other words, the door lining assembly 40 extends from the door panel assembly 20 so as to be raised therefrom, forming an inboard attachment surface to which the front portion of the weatherstrip 60 is attached.

The door lining assembly 40 also includes the raised rearward portion of the stepped lower edge adjacent the harness 32. Placement of the harness 32 above the weatherstrip 60 ensures the door lining assembly 40 is raised at the rearward portion to accommodate the harness 32. Therefore, the rear portion of the weatherstrip 60 is spaced downward from the door lining assembly 40 due to placement of the harness 32, and thus the door panel assembly 20 can form an outboard attachment surface to which the rear portion of the weatherstrip 60 is attached adjacent the harness 32. Since the rear portion of the weatherstrip 60 does not attach to the door lining assembly 40, and instead attaches to the door panel assembly 20, the outboard attachment surface does not extend inboard similar to the inboard attachment surface via a thickness by which the door lining assembly 40 extends into the interior of the vehicle 10.

In view of the aforementioned considerations, the weatherstrip 60 can be configured to attach to the slide door assembly 17R at both the inboard and outboard attachment surfaces of the door lining assembly 40 and the door panel assembly 20, respectively. To transition between the inboard and outboard attachment surfaces, the door lining assembly 40 is configured to include the weatherstrip support 50.

The weatherstrip support 50 can be disposed on the frontward portion of the stepped lower edge, specifically the flange extending therefrom, such that the weatherstrip support 50 is fore of the raised rearward portion. Particularly, the weatherstrip support 50 can form a rearmost part of the lower frontward portion of the stepped lower edge. The weatherstrip support 50 can be configured as a ramp or wedge shape sloping away from the interior of the vehicle 10 such that a front edge of the weatherstrip support 50 is inboard while a rear edge is outboard. As will be described below, a sloping surface transitioning between the inboard and outboard edges of the weatherstrip support 50 can include a clipping component which serves to attach the intermediate portion of the weatherstrip 60 to the weatherstrip support 50.

In the present embodiment, the weatherstrip 60 is configured to transition from inboard to outboard orientations across the weatherstrip support 50 due to the relatively uniform surface that the weatherstrip 60 compresses against when the slide door assembly 17R is in the closed position. In the closed position, the weatherstrip 60 contacts a surface along a lower edge of the interior opening for the slide door assembly 17R. That lower edge surface is approximately flat and dictates that the weatherstrip 60 maintain a complementary height along the lower portion of the slide door assembly 17R on which the weatherstrip 60 extends. This interaction between the weatherstrip 60 and the contacted surface prevent the weatherstrip 60 from attaching to the stepped lower edge completely, specifically at the raised rearward portion, since that would result in the rear portion of the weatherstrip 60 deviating from the contacted surface of the interior opening for the slide door assembly 17R.

The weatherstrip 60 of the present embodiment can be configured to overlap an end of the roller arm bracket 30 connected to the door lining assembly 40. While the weatherstrip 60 can extend over the end of the roller arm bracket 30 so as to be relatively inboard, other embodiments may have varying orientations of the roller arm bracket 30 and the weatherstrip 60.

Figure 6:
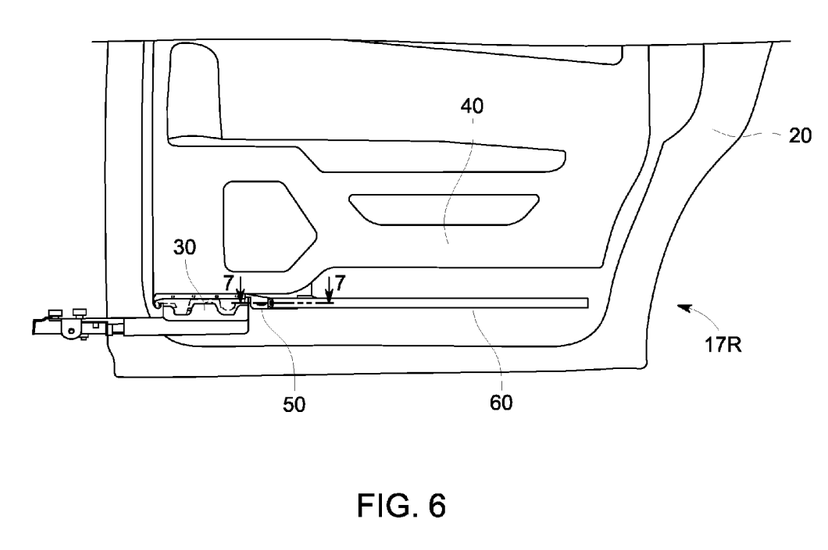
FIG. 6 is a perspective view of the weatherstrip attached to the weatherstrip support with a harness shown removed.

FIG. 6 is a perspective view of the weatherstrip 60 attached to the weatherstrip support 50 with the harness 32 shown removed. FIG. 6 illustrates the weatherstrip 60 extending in an approximately flat manner across the lower portion of the slide door assembly 17R, from the door lining assembly 40 to the door panel assembly 20 via the weatherstrip support 50. As described above, the height of the weatherstrip 60 on the slide door assembly 17R is maintained so as to be complementary to the contacted surface of the interior opening for the slide door assembly 17R. In FIG. 3, the front portion of the weatherstrip 60 covering the roller arm bracket 30 and the weatherstrip support 50 is not shown to provide a detailed view of those components.

Figure 7:
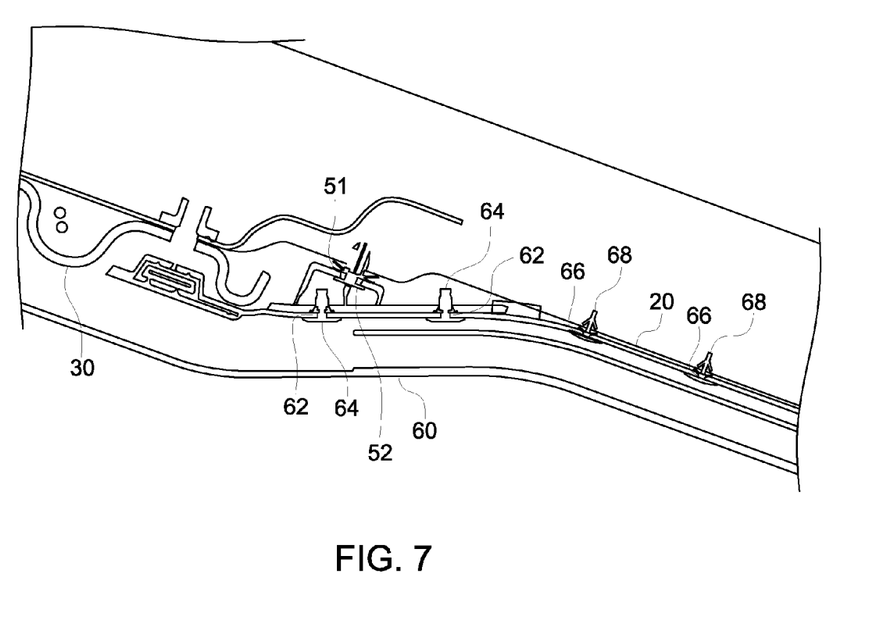
FIG. 7 is a cross-section view of the weatherstrip attached to the weatherstrip support of FIG. 6.

FIG. 7 is a cross-section view of the weatherstrip 60 attached to the weatherstrip support 50 of FIG. 6, with the front portion of the weatherstrip 60 shown. The cross-section view shows the weatherstrip 60 transition from inboard to outboard across the weatherstrip support 50 as the weatherstrip 60 extends from the door lining assembly 40 to the door panel assembly 20. The intermediate portion of the weatherstrip 60 follows the sloping surface of the weatherstrip support 50. FIG. 7 additionally illustrates the weatherstrip 60 covering the roller arm bracket 30, the end of the roller arm bracket 30 shown being disposed between the front portion of the weatherstrip 60 and the door panel assembly 20.

The weatherstrip support 50 of the present embodiment can include a support aperture 51 extending through a rear side so as to be adjacent a corresponding aperture in the door panel assembly 20. A support clip 52 can thereby be configured to be inserted through both the support aperture 51 and the corresponding aperture in the door panel assembly 20. This insertion of the support clip 52 can serve to connect the weatherstrip support 50 to the door panel assembly 20.

The weatherstrip support 50 can also include a pair of guide apertures 53 configured to extend through the sloping surface to anchor the intermediate portion of the weatherstrip 60. One of the guide apertures 53 is disposed proximate the front edge of the sloping surface, while the other is disposed proximate the rear edge. The pair of guide apertures 53 correspond to a pair of intermediate apertures 62 in the weatherstrip 60, the intermediate apertures 62 being aligned with the guide apertures 53 when the intermediate portion of the weatherstrip 60 is overlaid onto the sloping surface of the weatherstrip support 50. Intermediate clips 64 can then be inserted through the respectively aligned guide apertures 53 and intermediate apertures 62 to secure the weatherstrip 60 to the weatherstrip support 50.

The weatherstrip 60 can additionally include a pair of rear apertures 66 configured to extend through the rear portion towards the door panel assembly 20. The rear apertures 66 can be aligned with a corresponding pair of apertures in the door panel assembly 20. The rear apertures 66 thereby overlap the pair of apertures in the door panel assembly 20 when the weatherstrip 60 is overlaid onto the door panel assembly 20. Rear clips 68 can then be inserted through the respectively aligned rear apertures 66 and apertures in the door panel assembly 20 to secure the rear portion of the weatherstrip 60 to the door panel assembly 20.

In the present embodiment, the weatherstrip 60 is configured to attach to the door lining assembly 40 at the weatherstrip support 50, as well as the door panel assembly 20 by various clips. However, other fasteners may be used to secure the weatherstrip to components of the slide door assembly 17R such as the door panel assembly 20 and the door lining assembly 40. Furthermore, the weatherstrip support 50 can be secured to the door panel assembly 20 by other types of fasteners besides a clip as well.

Figure 8:
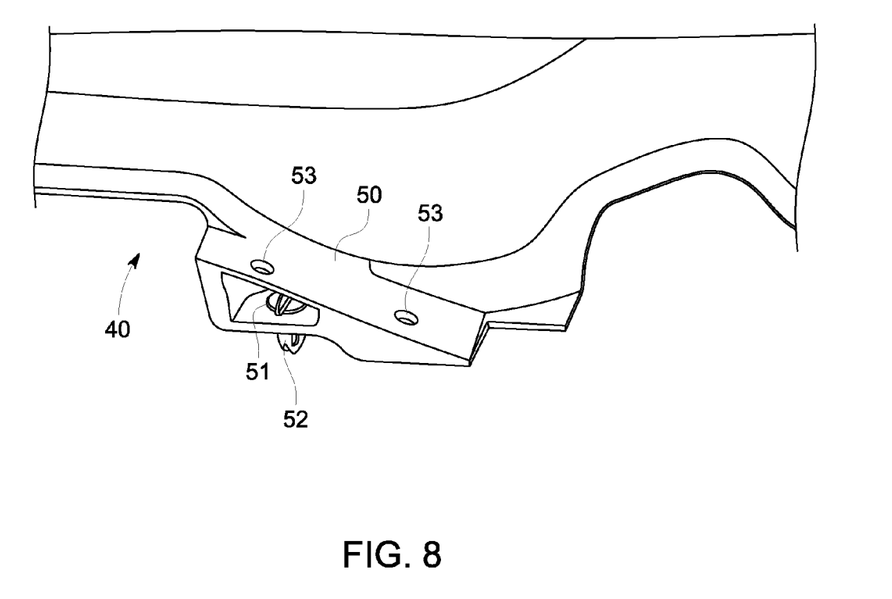
FIG. 8 is a perspective view of the weatherstrip support with weatherstrip shown removed.

FIG. 8 is a perspective view of the weatherstrip support 50 with weatherstrip shown removed. As described above, the weatherstrip support 50 can be configured as a ramp or wedge shape including a sloping surface to transition the weatherstrip 60 from inboard to outboard orientations along the slide door assembly 17R. The weatherstrip support 50 is shown including the guide apertures 53 to secure the weatherstrip 60, and the support aperture 51 to connect the weatherstrip support 50 to the door panel assembly 20.

The weatherstrip support 50 is configured with the sloping surface to facilitate a smooth transition for the intermediate portion of the weatherstrip 60, as well as provide a solid structure on which the weatherstrip 60 can be disposed.

III. Alternate Embodiments

Talk about sides of vehicle being interchangeable, since some places have driver on left and others on right While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of the passenger-side (right-side) slide door assembly 17R shown in FIGS. 2-8. However, embodiments are intended to include or otherwise cover any vehicle door having weatherstrips disposed thereon to form a seal within a door opening as disclosed above.

For example, exemplary embodiments are intended to include a sloping, ramp-like weatherstrip support 50 extending from the door lining assembly 40 so as to transition the weatherstrip 60 from inboard to outboard orientations along the slide door assembly 17R. This sloping weatherstrip support 50 can be otherwise shaped to facilitate transition of the weatherstrip support 50 from between various orientations within the door opening. In other words, the weatherstrip support 50 can be planar, curved, or otherwise contoured to include curves. In another alternate embodiment, the weatherstrip support 50 can extend a majority of a length of the weatherstrip 60 to which it is attached. The weatherstrip support 50 can be configured to accommodate various door openings and door assembly configurations taking into consideration placement of related components and structures such as the harness 32.

In fact, in some embodiments, the weatherstrip 60 is not secured to any portions of the door assembly other than the weatherstrip support 50. Instead, the weatherstrip support 50 extends the length of the weatherstrip 60 and serves as a guide for portions of the weatherstrip 60 throughout each path change and alteration necessary to maintain a seal with the door opening.

All or some of the alternative structures disclosed above with regard to the passenger-side (right-side) slide door assembly 17R also apply to the driver-side (left-side) slide door assembly 17L. The above alternative structures of the weatherstrip support 50 are merely provided for exemplary purposes, and as indicated above, embodiments are intended to cover any vehicle door weatherstrips disposed to form a seal within a door opening that operate or otherwise perform as disclosed above. Embodiments are also intended to include or otherwise cover any alternative or additional weatherstrip supports 50 that are structured and disposed to perform as disclosed above with regard to the door lining and door panel assemblies 40,20.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A door lining assembly for use with a vehicle defining a front, a rear and having a vehicle interior, a vehicle door with an interior side facing the vehicle interior and an exterior side facing away from the vehicle interior, and weatherstripping configured to facilitate sealing of the door in a closed position, the door lining assembly configured to be mounted on the interior side of the vehicle door, the door lining assembly comprising:
   a front portion connected to a lower section of the interior side of the vehicle door, the front portion including a flange that is connected to the weatherstripping; and
   an elongated transition portion that extends rearward from the front portion to the lower section of the interior side of the vehicle door in a vehicle longitudinal direction, the transition portion being structured to have a gradually decreasing depth in a lateral direction of the vehicle, such that one end of the transition portion that is connected to the front portion extends further into the vehicle interior than the opposite longitudinal end disposed rearward thereof,
   wherein the transition portion is configured to support the weatherstripping as the weatherstripping transitions between the flange and the interior side of the vehicle door; and the transition portion is removably attached to the front portion and the lower section of the interior side of the vehicle door.

2. The door lining assembly according to claim 1, wherein the transition portion has a sloping surface extending from the one end to the opposite longitudinal end.

3. The door lining assembly according to claim 2, wherein the sloping surface is approximately planar so as to define a triangular cross-section.

4. The door lining assembly according to claim 2, wherein the transition portion is unitary with the front portion.

5. The door lining assembly according to claim 1, wherein the transition portion includes at least one clipping portion configured to be connected to the weatherstripping.

6. The door lining assembly according to claim 5, wherein the transition portion includes at least one anchor portion configured to connect the transition portion to the lower section of the interior side of the vehicle door.

7. The door lining assembly according to claim 1, wherein the opposite longitudinal end of the transition portion is substantially flush with the lower section of the interior side of the vehicle door.

8. The door lining assembly according to claim 7, wherein the one end of the transition portion is substantially flush with the front portion.

9. The door lining assembly according to claim 1, wherein a depth of the transition portion at the one end is approximately equal to a distance by which the flange of the front portion is spaced from the lower section of the interior side of the vehicle door in the lateral direction.

10. The door lining assembly according to claim 1, wherein the transition portion is configured to connect to an intermediate portion of the weatherstripping such that ends of the weatherstripping extend past the one end and the opposite longitudinal end.

11. A vehicle door assembly for use with a vehicle defining a front, a rear and having an interior, the vehicle door assembly comprising:
   a vehicle door including an interior side facing the interior and an exterior side facing away from the interior;

a door lining assembly mounted on the interior side of the vehicle door and including:
- a front portion connected to a lower section of the interior side of the vehicle door, the front portion including a flange that is connected to the weatherstripping; and
- an elongated transition portion that extends rearward from the front portion to the lower section of the interior side of the vehicle door in a vehicle longitudinal direction, the transition portion being structured to have a gradually decreasing depth in a lateral direction of the vehicle, such that one end of the transition portion that is connected to the front portion extends further into the vehicle interior than the opposite longitudinal end disposed rearward thereof, the transition portion configured to be removably attached to the front portion and the lower section of the interior side of the vehicle door; and
- weatherstripping configured to facilitate sealing of the door in the a closed position, the weatherstripping mounted on each of the door lining assembly and the interior side of the door assembly such that the weatherstripping extends along the elongated transition portion as the weatherstripping transitions between the flange and the interior side of the vehicle door.

12. The vehicle door assembly according to claim 11, wherein the transition portion has a sloping surface extending from the one end to the opposite longitudinal end.

13. The vehicle door assembly according to claim 12, wherein the sloping surface is approximately planar so as to define a triangular cross-section.

14. The vehicle door assembly according to claim 12, wherein the transition portion is unitary with the front portion.

15. The vehicle door assembly according to claim 11, wherein the transition portion includes at least one clipping portion configured to be connected to the weatherstripping.

16. The vehicle door assembly according to claim 15, wherein the transition portion includes at least one anchor portion configured to connect the transition portion to the lower section of the interior side of the vehicle door.

17. The vehicle door assembly according to claim 11, wherein the opposite longitudinal end of the transition portion is substantially flush with the lower section of the interior side of the vehicle door.

18. The vehicle door assembly according to claim 17, wherein the one end of the transition portion is substantially flush with the front portion.

19. The vehicle door assembly according to claim 11, wherein a depth of the transition portion at the one end is approximately equal to a distance by which the flange of the front portion is spaced from the lower section of the interior side of the vehicle door in the lateral direction, and the transition portion is configured to connect to an intermediate portion of the weatherstripping such that ends of the weatherstripping extend past the one end and the opposite longitudinal end.

20. A method of installing a door lining assembly on a vehicle door of a vehicle defining a front, a rear and having a vehicle interior, the vehicle door including an interior side facing the vehicle interior and an exterior side facing away from the vehicle interior, and weather-stripping configured to facilitate sealing of the door in a closed position, the method comprising:
- connecting a front portion of a door lining assembly to a lower section of the interior side of the vehicle door;
- connecting a flange of the front portion to the weatherstripping;
- removably attaching an elongated transition portion to the front portion and the lower section of the interior side of the vehicle door so as to extend rearward from the front portion to the lower section in a vehicle longitudinal direction;
- configuring the transition portion to have a gradually decreasing depth in a lateral direction of the vehicle, such that one end of the transition portion that is connected to the front portion extends further into the vehicle interior than the opposite longitudinal end disposed rearward thereof; and
- attaching the weather-stripping to each of the door lining assembly and the interior side of the door assembly such that the weather-stripping extends along the transition portion as the weather-stripping transitions between the flange and the interior side of the vehicle door.

* * * * *